United States Patent [19]

Burke et al.

[11] 4,327,766
[45] May 4, 1982

[54] CANNISTER MOUNTING BRACKET

[75] Inventors: James W. Burke, Long Grove; John N. Cook, Island Lake, both of Ill.

[73] Assignee: Kold Ban International, Ltd., Algonquin, Ill.

[21] Appl. No.: 190,871

[22] Filed: Sep. 25, 1980

Related U.S. Application Data

[62] Division of Ser. No. 879,253, Feb. 21, 1978, Pat. No. 4,231,391.

[51] Int. Cl.³ .................................................. F16K 27/08
[52] U.S. Cl. .................................... 137/343; 137/382; 123/180 R
[58] Field of Search ............... 137/382, 343; 222/185; 248/313; 123/180 R, 180 AC, 195 A, 187.5 R

[56] References Cited
U.S. PATENT DOCUMENTS

| | | | |
|---|---|---|---|
| 683,786 | 10/1901 | Innes | 222/185 |
| 2,379,985 | 7/1945 | Newhall | 248/313 |
| 2,986,135 | 5/1961 | Clark et al. | 123/180 R |
| 3,416,507 | 12/1968 | Little | 123/180 R |
| 3,661,133 | 5/1972 | Rasch | 123/180 R |
| 3,960,131 | 6/1976 | Davis | 123/180 R |
| 4,231,391 | 11/1980 | Burke et al. | 137/343 |

*Primary Examiner*—A. Michael Chambers
*Attorney, Agent, or Firm*—Hume, Clement, Brinks, Willian & Olds, Ltd.

[57] ABSTRACT

An improved cannister mounting bracket is disclosed which is adapted for use with a valve assembly. The bracket may be readily adjusted to accommodate cannisters of two differing sizes and to provide protection for the valve assembly when no cannister is mounted in place. Adjustment is made in large part through a pair of link members and a pivotable frame member which can be rotated in order to alter the configuration of the bracket.

6 Claims, 6 Drawing Figures

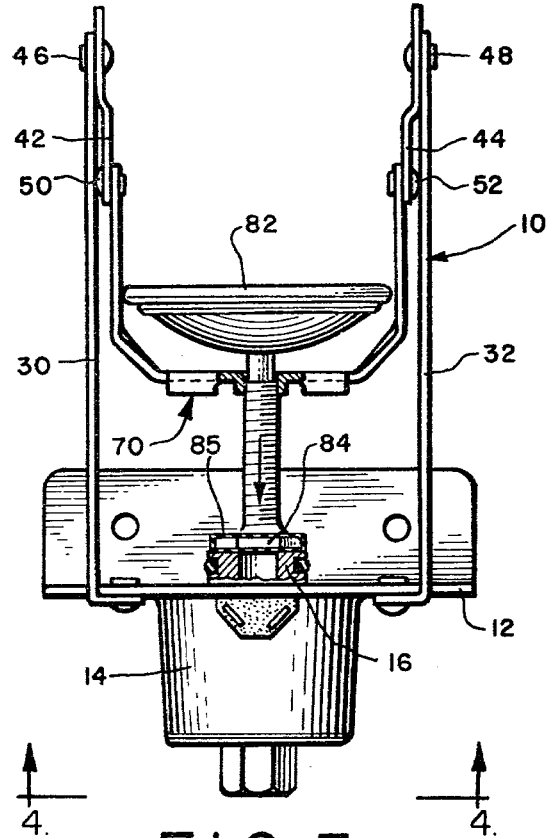
FIG. 3
FIG. 4
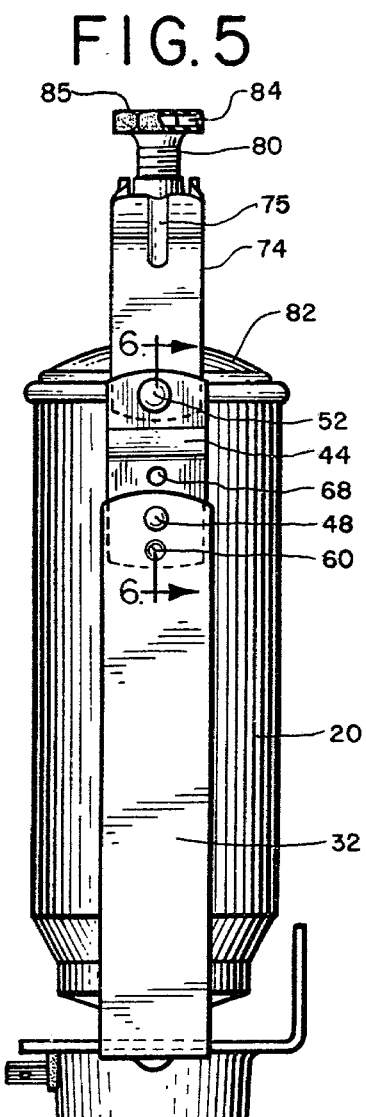
FIG. 5
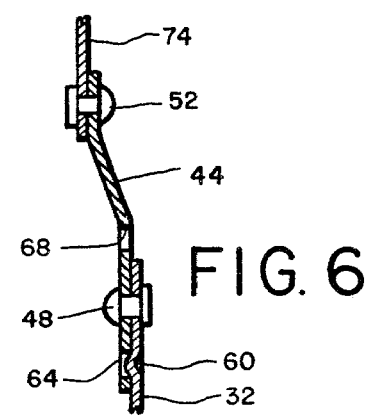
FIG. 6 ns. 4,327,766

CANNISTER MOUNTING BRACKET

This application is a division of application Ser. No. 879,253, filed Feb. 21, 1978 now U.S. Pat. No. 4,231,391.

BACKGROUND OF THE INVENTION

The present invention is directed to an improved mounting bracket, and more particularly to a readily adjustable bracket for mounting a cannister to a valve assembly.

Various applications require the use of a mounting bracket to releasably secure a cannister to a valve assembly. For example, several types of diesel engine starting aids inject ether based fuel into the diesel engine during the start-up procedure. The ether based fuel is often packaged in aerosol cannisters, and a mounting bracket is used to releasably secure fuel cannisters to the valve assembly of the ether injection system. The mounting brackets used in these and similar applications should preferably accommodate cannisters of varying sizes with a minimum of adjustment. Furthermore, it is often desirable for these brackets to include means for protecting the valve assembly from dirt when a cannister is not mounted in the bracket.

One type of mounting bracket which has been used in the past includes a U-shaped frame which defines several apertures along the parallel ends of the frame and is provided with a cap which is positioned by a threaded adjustment screw. This bracket is used in conjunction with a plate which is provided with protruding tabs on opposed sides of the plate and serves as a mounting surface for a valve assembly. The bracket is assembled for use by inserting the tabs on the plate into the appropriate apertures in the frame. After the bracket has been assembled, it is used by screwing the threaded cap in place over one end of an aerosol cannister, thereby positioning the aerosol cannister against the valve assembly.

Such mounting brackets exhibit certain disadvantages. In that the U-shaped frame must be disassembled from the mounting plate in order to adjust the frame length, the frame is a separable piece of the bracket which may, therefore, become separated from the bracket and misplaced. Moreover, many of these mounting brackets include separate extension pieces which may be affixed to the frame in order to extend the maximum length of the frame, and these extension pieces also may be lost or misplaced. Furthermore, the end sections of the frame protrude beyond the rear face of the mounting plate when the frame is positioned so that the cap is relatively near the mounting surface. In some applications the protruding end sections may adversely limit the locations in which the bracket may be mounted.

SUMMARY OF THE INVENTION

The present invention is directed to an improved mounting bracket that may be readily adjusted without disassembling the bracket.

One embodiment of the invention includes an adjustable link member in the bracket which permits the bracket to be readily adjusted to mount cannisters of differing sizes. The link member is pivotably secured to the bracket and may be pivoted into either an extended or a retracted position. When extended, the link member lengthens the bracket which can then accommodate longer cannisters. Similarly, the bracket can be adjusted for shorter cannisters by pivoting the link member into the retracted position.

A second feature of the invention is a pivotable frame member which is provided with two surfaces: a valve assembly contact surface which is adapted to contact a valve assembly mounted to the bracket, thereby protecting the valve assembly from contamination; and a cannister contact surface which is adapted to contact and position a cannister in the bracket. By pivoting the frame member to the appropriate orientation it can be used either to mount a cannister in the bracket or to protect a valve assembly.

A mounting bracket embodying these two features of this invention may be constructed so that adjustment does not require disassembly of the bracket. Accordingly, the problem of unattached component parts which may be lost or misplaced, and other problems associated with disassembly, may be avoided. Furthermore, this bracket may be converted to a valve assembly protection device without causing any of the component parts of the bracket to protrude substantially beyond the rear face of the mounting plate. The invention together with further objects and attendant advantages will be best understood by reference to the following detailed description taken in connection with the appended drawings.

BRIEF DESCRIPTION OF THE DRAWINGS

FIG. 3 is an elevational view in partial cutaway of the bracket of FIG. 1, showing the bracket in a third configuration.

FIG. 4 is an end view taken along line 4—4 of FIG. 3.

FIG. 5 is a side view taken along line 5—5 of FIG. 1.

FIG. 6 is an enlarged sectional view of a portion of the bracket taken along line 6—6 of FIG. 5.

DETAILED DESCRIPTION OF A PREFERRED EMBODIMENT

Figures 1, 2:
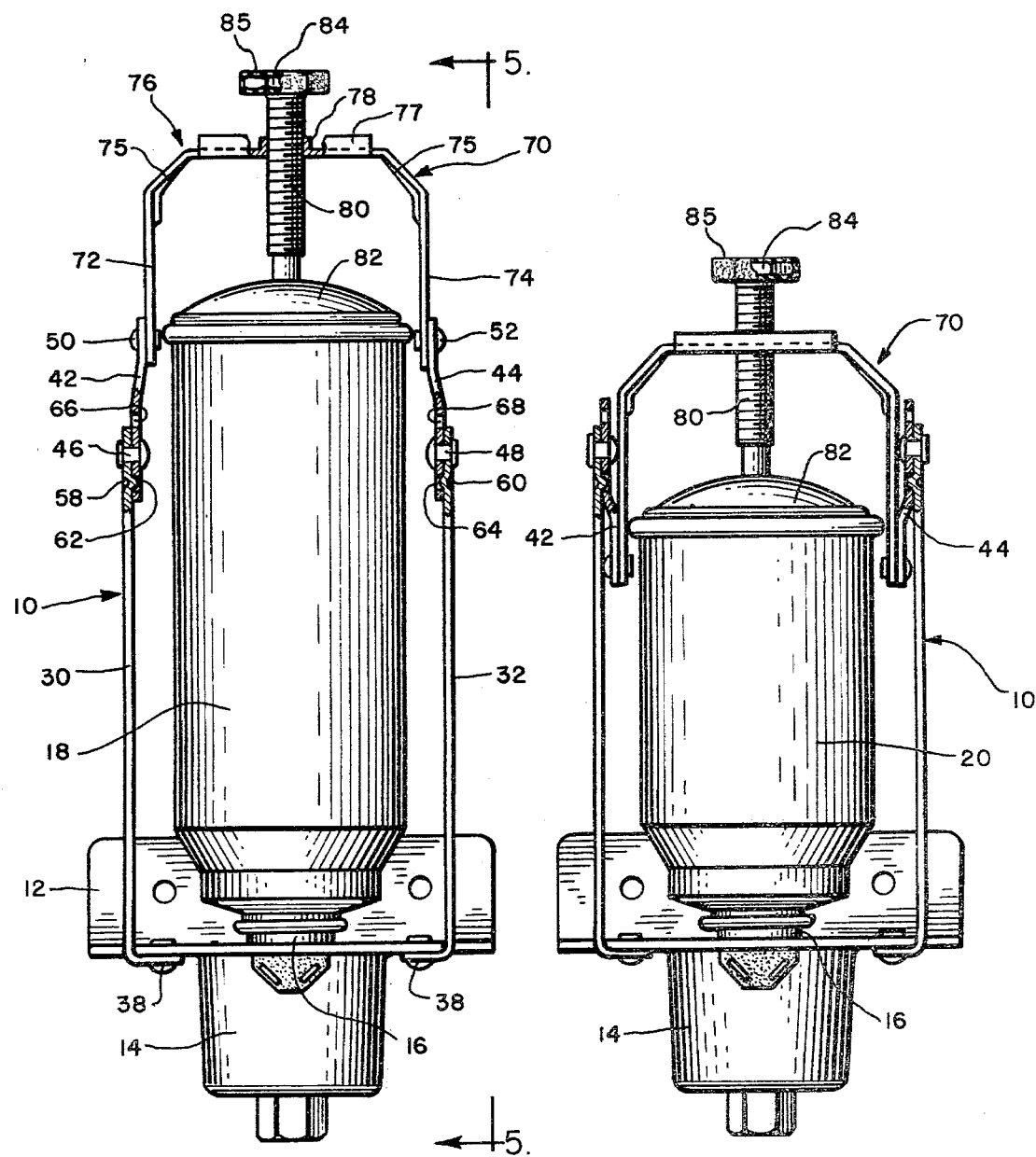
FIG. 1 is an elevational view in partial cutaway of one embodiment of the bracket of this invention showing the bracket in a first configuration.
FIG. 2 is an elevational view in partial cutaway of the bracket of FIG. 1, showing the bracket in a second configuration.

Referring now to the drawings, FIG. 1 represents a preferred embodiment of the invention. Reference numeral 10 is used to refer generally to the mounting bracket of this embodiment. which is securely fastened to a mounting plate 12. A valve assembly 14 including a valve stator 16 is also mounted on the plate 12, with the stator 16 passing through the plate 12 and oriented toward the bracket 10. In this preferred embodiment the valve assembly 14 including the valve stator 16 comprises an electrically operated valve. It should be understood, however, that alternate embodiments may employ mechanically operated valve assemblies, and such alternate ambodiments are included in the scope of the present invention. An aerosol cannister 18 is mounted in the bracket 10, which supplies a positioning force urging the cannister 18 onto the valve stator 16.

The bracket 10 includes two cannister support members 30, 32 which are rigidly affixed to the plate 12 by fasteners such as rivets 38. As best seen in FIG. 4, the plate 12 defines for each support member 30, 32 an edge recess 40 which cooperates with the fasteners 38 to restrict the rotation of the support members 30, 32. In this way each of the support members 30, 32 is rigidly mounted to the plate 12 with a single fastener 38.

A frame member 70 is also included in the bracket 10, and defines two substantially parallel end sections 72, 74 which are secured to a central section 76. The frame member 70 is preferably stamped from a single piece of sheet metal, and gussets 75 and ribs 77 are provided to strengthen the frame member 70. A central threaded aperture 78 is defined by the frame member 70. A threaded adjusting screw 80 is rotatably mounted in the aperture 78, and is provided with a cannister contact member such as a retaining cup 82 mounted at one end of the screw 80 and a valve assembly contact member such as an enlarged head 84 rigidly secured to the other end of the screw 80. In this embodiment the retaining cup 82 is substantially circular in cross section and adapted to fit over the base of an aerosol cannister 18. The enlarged head 84 is provided with a resilient covering material, or seal member 85, and may be placed adjacent the valve stator 16 in order to protect the stator when no cannister is mounted in the bracket. See FIG. 3. The resilient covering material improves the seal between the head 84 and the stator 16. A covering material, or seal member 85 such as that commercially available under the trade name Plystasol, is well suited for this application. The enlarged head 84 is hex-shaped and may be grasped either by hand or with a wrench and rotated, thereby turning the adjusting screw 80 and positioning the retaining cup 82.

Link members 42, 44 are pivotably connected to the support members 30, 32, respectively, by fasteners such as rivets 46, 48. Each link member 42, 44 is also pivotably connected to one of the end sections 72, 74 of the frame member 70 by a fastener such as a rivet 50, 52. Detents are provided which hold the link members 42, 44 in either the extended position, as shown in FIG. 1, or the retracted position, as shown in FIGS. 2 and 3. As best seen in FIGS. 1, 2, and 6, these detents are made up of apertures 62, 66 formed in link member 42, and apertures 64, 68 formed in link member 44, and protrusions 58, 60 which are stamped in support members 30, 32. The protrusions 58, 60 extend into the apertures 62, 64 or 66, 68 when the link members 42, 44 are positioned in either the extended or retracted positions, thereby holding the link members in place.

The components of the bracket 10 of this embodiment can be fabricated from various materials; however, in many applications components such as the support members 30, 32 the link members 42, 44, the frame member 70, and the retaining cup 82 may be inexpensively stamped from sheet metal such as steel. The dimensions and materials of the components should be chosen according to well understood principles of mechanical and production engineering to provide a bracket with the desired strength, weight, and cost characteristics.

One of the advantages of the bracket 10 is that it may be easily adjusted by merely pivoting the frame member 70 and the link members 42, 44 to mount cannisters of two differing lengths or to protect the valve stator 16 in the absence of a cannister. FIG. 1 depicts the bracket 10 adjusted to mount a long cannister 18 to the valve stator 16. The link members 42, 44 are in the extended position, and the cup 82 is oriented toward the stator 16 and the base of the cannister 18. The cannister 18 is urged against the valve stator 16 by turning the hex head 84, thereby advancing the cup 82.

FIG. 2 shows the bracket 10 adjusted to mount a short cannister 18. The link members 42, 44 have been pivoted into the retracted position, and once again the cup 82 is oriented toward the stator 16.

In FIG. 3 the bracket 10 is shown adjusted so that the hex head 84 provides protection to the valve stator 16. The link members 42, 44 are in the retracted position, and the frame member 70 has been pivoted to orient the hex head 84 toward the stator 16.

In order to insure that the bracket 10 operates in all three configurations, two spatial relationships must be preserved. The separation between the two sets of pivotable fasteners, such as the fasteners 46, 50 of link member 42, must be chosen to allow the cup 82 to be adjusted to mount both the long cannister 18 and the short cannister 20. Furthermore, the separation between the center section 76 of the frame member 70 and the pivotable fasteners 50, 52 must be chosen so that the adjustment screw 80 can be positioned to bring the cup 82 to bear against a cannister and the hex head 84 against the stator 16. The preferred embodiment includes a threaded adjustment screw 80 which allows the bracket to be adjusted for various sized cannisters. Therefore, these two spatial relationships need not be precisely maintained. In practice, it has been found that a separation of approximately one and 5/32 inches between the two sets of pivotable fasteners 46, 50 or 48, 52 can be used in a bracket adapted to mount aerosol cannisters having overall lengths of approximately four and three-quarters and seven inches.

Of course, it should be understood that various changes and modifications to the preferred embodiment described herein will be apparent to those skilled in the art. For example, several types of materials and fasteners may be used, and proportions may be varied to meet the needs of individual applications. Such changes and modifications can be made without departing from the scope of the present invention and without diminishing its attendant advantages. It is, therefore, intended that such changes and modifications be covered by the following claims.

We claim:

1. A bracket for mounting a cannister to a valve assembly in a starting fluid injection system for an internal combustion engine, said bracket comprising:

a valve assembly;

a frame member;

a cannister contacting member mounted on a first side of the frame member;

a valve assembly contacting member mounted on a second side of the frame member;

means for pivotably mounting the frame member to the valve assembly such that the frame member is pivotable between a first position, in which the cannister contacting member is oriented toward the valve assembly to contact and hold a cannister against the valve assembly, and a second position, in which the valve assembly contacting mamber is oriented toward the valve assembly to contact and protect the valve assembly in the absence of a cannister; and a resilient, elastomeric member included in the valve assembly contacting member such that the elastomeric member is urged against the valve assembly when the frame member is in the second position, said elastomeric member operating to seal the valve assembly and to engage the valve assembly frictionally such that the valve assembly contact member is substantially prevented from vibrating out of contact with the valve assembly when the bracket is subjected to vibration associated with the internal combustion engine.

2. The bracket of claim 1 wherein the frame member defines a threaded aperture, the cannister contacting member and the valve assembly contacting member are mounted on opposed ends of a threaded shaft, and the threaded shaft is rotatably and adjustably positioned in the threaded aperture.

3. A bracket for mounting a cannister to a valve assembly in a starting fluid injection system for an internal combustion engine, said bracket comprising:
   a valve assembly;
   a pair of support members;
   means for mounting the support members to the valve assembly such that the valve assembly is disposed between the support members;
   a frame member defining a threaded aperture;
   means for pivotably mounting the frame member between the support members;
   a threaded shaft rotatably positioned in the threaded aperture;
   a cannister contacting member mounted to a first end of the shaft;
   a valve assembly contacting member mounted to a second end of the shaft, said valve assembly contacting member including, non metallic, conformable contact surface positioned to contact, seal and frictionally engage the valve assembly when the frame member is pivoted to place the valve assembly contacting member adjacent the valve assembly and the threaded shaft is rotated to bring the contact surface against the valve assembly, said contact surface operating substantially to prevent the valve assembly contact member from vibrating out of contact with the valve assembly when the bracket is subjected to vibration associated with the internal combustion engine.

4. A bracket for mounting a cannister to a valve assembly in a starting fluid injection system for an internal combustion engine, said bracket comprising:
   a valve assembly;
   a frame member;
   a cannister contacting member mounted on a first side of the frame member;
   a valve assembly contacting member mounted on a second side of the frame member;
   means for pivotably mounting the frame member to the valve assembly such that the frame member is pivotable between a first position, in which the cannister contacting member is oriented toward the valve assembly to contact and hold a cannister against the valve assembly, and a second position, in which the valve assembly contacting member is oriented toward the valve assembly to contact and protect the valve assembly in the absence of a cannister; and
   means for holding the valve assembly contacting member in the second position when the valve assembly contacting member is hand tightened against the valve assembly, such that the valve assembly contacting member is substantially prevented from vibrating out of the second position when the bracket is subjected to vibration associated with the internal combustion engine;
   said holding means comprising an elastomeric contact surface included in the valve assembly contact member, said contact surface positioned to contact and frictionally engage the valve assembly such that the elastomeric contact surface provides a frictional force which substantially prevents the elastomeric contact surface from vibrating out of contact with the valve assembly when the bracket is subjected to vibration associated with the internal combustion engine.

5. A bracket for mounting a cannister to a valve assembly in a starting fluid injection system for an internal combustion engine, said bracket comprising:
   a valve assembly;
   a frame member;
   a cannister contacting member mounted on a first side of the frame member;
   a valve assembly contacting member mounted on a second side of the frame member;
   means for pivotably mounting the frame member to the valve assembly such that the frame member is pivotable between a first position, in which the cannister contacting member is oriented toward the valve assembly to contact and hold a cannister against the valve assembly, and a second position, in which the valve assembly contacting member is oriented proximate to the valve assembly to protect the valve assembly in the absence of a cannister; and
   means for holding the valve assembly contacting member in the second position when the valve assembly contacting member is hand tightened against the valve assembly, such that the valve assembly contacting member is substantially prevented from vibrating out of the second position when the bracket is subjected to vibration associated with the internal combustion engine;
   said holding means comprising means for interposing a resilient, non-metallic, conformable seal member between the valve assembly and the valve assembly contacting member when the frame member is in the second position, in order to frictionally engage the valve assembly with the valve assembly contacting member such that the resilient seal member provides a frictional force which retards the valve assembly contacting member from vibrating out of the second position when the bracket is subjected to vibration associated with the internal combustion engine.

6. A bracket for mounting a cannister to a valve assembly in a starting fluid injection system for an internal combustion engine, said bracket comprising:
   a valve assembly;
   a frame member;
   a cannister contacting member mounted on a first side of the frame member;
   a valve assembly contacting member mounted on a second side of the frame member;
   means for pivotably mounting the frame member to the valve assembly such that the frame member is pivotable between a first position, in which the cannister contacting member is oriented toward the valve assembly to contact and hold a cannister against the valve assembly, and a second position, in which the valve assembly contacting member is oriented proximate to the valve assembly to protect the valve assembly in the absence of a cannister; and
   means for holding the valve assembly contacting member in the second position when the valve assembly contacting member is hand tightened against the valve assembly, such that the valve assembly contacting member is substantially prevented from vibrating out of the second position when the bracket is subjected to vibration associated with the internal combustion engine;

said holding means comprising means for interposing an elastomeric seal member between the valve assembly and the valve assembly contacting member when the frame member is in the second position, in order to frictionally engage the valve assembly with the valve assembly contacting member such that the elastomeric seal member provides a frictional force which retards the valve assembly contacting member from vibrating out of the second position when the bracket is subjected to vibration associated with the internal combustion engine.

* * * * *